United States Patent [19]

Bozzetti et al.

[11] Patent Number: 5,038,276

[45] Date of Patent: Aug. 6, 1991

[54] DATA PROCESSING SYSTEM HAVING DUAL ARBITER FOR CONTROLLING ACCESS TO A SYSTEM BUS

[76] Inventors: Fabio Bozzetti, 20010 S. Pietro all'Olmo (MI); Maurizio Grassi, Via Udine 1, 20010 Pregnana Milanese; Calogero Mantellina, Via F. Baracca 5, 20023 Cerro Maggiore, all of Italy

[21] Appl. No.: 494,659

[22] Filed: Mar. 16, 1990

[30] Foreign Application Priority Data

Apr. 24, 1989 [IT] Italy ................................ 20267 A/89

[51] Int. Cl.$^5$ ................................................ G06F 9/46
[52] U.S. Cl. ........................... 364/200; 364/242.92; 364/270; 364/270.7; 364/270.3
[58] Field of Search ............................. 364/200, 900

[56] References Cited

U.S. PATENT DOCUMENTS 4,229,791 10/1980 Levy .................................... 364/200

4,817,066 3/1989 Lewis .................................. 364/476

*Primary Examiner*—Michael R. Fleming
*Assistant Examiner*—Andrew Bodendorf
*Attorney, Agent, or Firm*—J. S. Solakian; J. H. Phillips

[57] ABSTRACT

A data processing system having a dual arbiter for controlling access to a system bus where two processors, each clocked by one of two timing signals having equal periods but out of phase by half a period, operate synchronously each to the other, but outphased by the half period of the clock signal, and generate equal priority signals requesting access to a system bus, each processor in a time distinct and non overlapped phase of the respective timing signals, and where an arbitration unit grants system bus access to either one or the other requesting processor on the time order in which the access requesting signals are received, the granting being performed asynchronously and without sampling and set up delays.

2 Claims, 2 Drawing Sheets

DATA PROCESSING SYSTEM HAVING DUAL ARBITER FOR CONTROLLING ACCESS TO A SYSTEM BUS

FIELD OF THE INVENTION

The present invention relates to a data processing system having a dual arbiter for controlling access to a system bus.

BACKGROUND OF THE INVENTION

It is known that in modern data processing systems a plurality of processors may be used to increase performance. The processors have access to shared resources, for instance a working memory, through a system bus. In order to avoid conflicts and interference in system bus access, arbitration units are used. In case of concurrent bus access requests from a plurality of processors, the arbitration unit grants access to one processor at a time on the basis of predetermined priority criteria.

If the processors have the same features and functionality, it is advisable that they receive the same access priority right. Therefore, the arbitration unit operates according to a criterion known as "round robin". If a processor K among N ordered processor has just obtained access to the system bus, before granting access again to the same processor, it is determined whether processors K+1→N and 1→K−1 need access to the bus. If processor K+1 needs access to the bus, it receives access permission first. If processor K+1 does not need access to the bus, but processor K+2 does, then access is granted to processor K+2, and so on. If processor K again needs access to the bus, access is granted thereto only if no other processor needs access. In the case of two processors competing for access to the bus, the round robin criterion leads, at the extreme, to the alternative granting of access to each of the two processors, neither of which is privileged.

An arbitration unit which follows this criterion, may be, from a functional standpoint, one of three kinds:

1) Sequential. The arbitration unit polls, in timing sequence and according to a predetermined order, the presence of access requests to the system bus, one at a time, with a scanning cycle which requires a long time. For this reason, the sequential approach is generally no longer used.

2) Synchronous. The several processors operate in synchronism and are clocked by a period timing signal which defines operative cycles or time frames. The access requests from the several processors are generated at predetermined times with a predetermined leading or lagging edge of the transitions of the timing signal. The arbitration unit, synchronously with the timing signal, samples the status of all the access requests and decides which of the processors has right of access. The arbitration time comprises two parts: the time of the decisional process required by the arbitration logic to grant one access since the sampling instant and the time elapsing from the generation of the access requests to the sampling instant. This kind of arbitration unit has the disadvantage that the arbitration process is not started as soon as an access request is generated, but is deferred until a predetermined sampling instant at which the status of the several access requests is stable.

3) Asynchronous. Even if the several processors may operate in synchronism, they generally work asynchronously from each to the other. Bus access requests are randomly generated at unpredictable times, the one as to the others and to a possible periodic timing signal used by the arbitration unit. The arbitration unit may sample at high frequency the status of the several access requests. However, since the access requests may change status at the sampling instant, they may cause instability in the sampling circuits; therefore the decisional process must be delayed until the sampling circuits have taken a stable state. The same problem occurs in those arbitration units where the sampling of the bus access request is performed as soon as an access request is detected.

Other access requests, nearly simultaneous to the first one, may cause instability of the sampling circuits.

SUMMARY OF THE INVENTION

The present invention overcomes these limitations, in case arbitration is to be performed between two processors and provides a data processing system having a dual arbiter for controlling access to a system bus where the arbitration time is reduced to the time required by the logical circuits for the decisional process without need to wait for predetermined sampling instants or for circuit status stabilization.

The dual arbiter of the invention grants access to the system bus (and to resources connected thereto) with an equitable criterion to either one of two processors which, in case of access competition, alternate in access to the system bus, with arbitration time reduced to a minimum, hence with an optimum exploitation of the shared resource formed by the system bus.

According to the invention, these advantages are achieved, in a system where the two processors operate in synchronous mode on the basis of timing cycles equal for both processors, by the combination of a very simple arbitration unit and a timing unit which provides two timing signals of equal frequency, but with an half period offset the one as to the other. Each of the two signals is respectively used to clock the one and the other of the two processors so that they operate with a predetermined offset in the timing cycle and generate bus access requests in distinct, non overlapped phases of the two timing signals.

In this way, each of the access requests is asserted when the access request signal of the other processor is in a stable state, being already asserted or deasserted. By this arrangement the arbitration unit may be implemented with a very simple and fast logic circuit (conceptually a control gate for each of the processors) which grants access to the processor which is first to request access. The logic operates as soon as an access request is asserted. In case of access competition, the arbitration leads automatically to access granting alternatively to the one and the other processor.

DESCRIPTION OF THE DRAWING

The features and the advantages of the invention will appear more clearly from the following description of a preferred form of embodiment and from the enclosed drawings where.

DETAILED DESCRIPTION OF THE INVENTION

For a better understanding of the invention, the following description relates to an embodiment in which two processors which compete for access to a shared bus each comprise an integrated processor of the type 68030, manufactured by the U.S. firm, Motorola, and well known to those skilled in the art. This permits restricting the description of the processors to those aspects which are essential to an understanding of the invention. It will be clearly understood, however, that the invention may be used with other kinds of processors.

Figure 1:
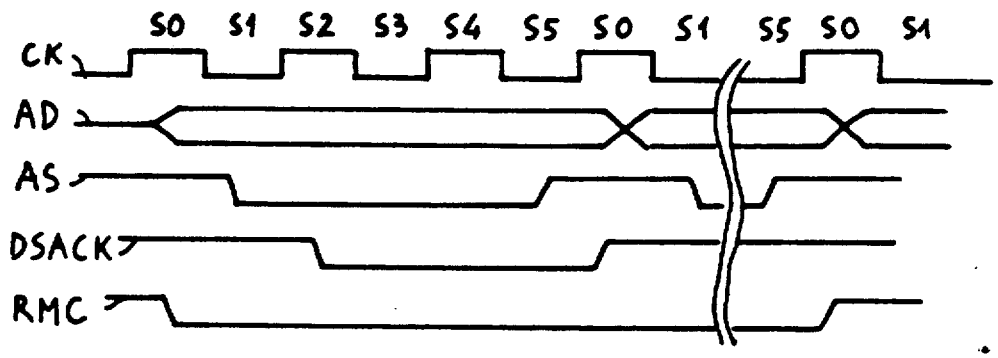
FIG. 1 shows, in timing diagram, some signals exchanged by one processor with external units.

FIG. 1 shows, in timing diagram, the operation of the processors, with reference to the signals essential to the understanding of the invention.

Microprocessor 68030 operates on the basis of machine timing cycles CK (diagram CK) which typically have a period of 50 nsec. Each cycle comprises two equal duration phases. When the microprocessor has to perform external operations, for instance memory read/write operations, the operation is performed in a plurality of full timing cycles, with a minimum of three, which define six operative states: S0, S1, S2, S3, S4, S5. States S0, S2, S4 correspond to the high level of signal CK, and the other states to the low level of signal CK.

When in state S0, the microprocessor issues address and command signals which remain stable during all the subsequent states, S5 included, and are removed from the output in a following S0 state. During state S1, the microprocessor asserts a signal AS by dropping it to electrical level 0. AS is a strobe and validation signal for the addresses and commands already issued and remains asserted until state S5, during which it is deasserted. AS is the first useful signal issued by the microprocessor indicating the activation of an external operation.

Although the 68030 product specifications do not give any guarantee on the instant at which AS is asserted during state S1 and on the instant at which AS is deasserted (except indicating that AS is asserted or deasserted at least 3 nanoseconds after the clock signal falling edge which immediately precedes), the assertion/deassertion of the signal typically occurs 10–15 nsec before the next following clock signal transition. In addition, it is well known that the delay in assertion or deassertion of the signals, relative to the clock signal transition immediately preceding, largely depends upon the capacitive load which the signals have to drive. If the capacitive load is limited to few tens of picoFarads, it is possible to obtain the assertion and deassertion of signal A (and other signals) at least ten nsec before the transition of the next following clock signal.

Signal AS may be used as an enabling signal for address and command decoding operations and therefore for selecting resources and for starting external operations.

During the states from S2 to S5, the microprocessor exchanges, with external circuits, other signals and data which are not relevant to the invention.

If, during state S2, the microprocessor receives a signal DSACK asserted, it will complete the external operation by deasserting AS during state S5. Otherwise the microprocessor enters a non operative, wait state, lasting for one or more clock periods, until signal DSACK is received. Thereafter it enters state S3.

Among signals generated during state S0 there is another, RMC, which must be discussed. If RMC is asserted, it indicates that a plurality of subsequent external operations must be performed in an unseverable way, until signal RMC is deasserted. Thus, if the processor has to perform a memory read operation followed by an unseverable write operation, it moves from state S0 to state S5 in order to perform the read operation, than from state S5 to state S0 and again from state S to state S5 in order to perform the write operation. Durinq all these states, signal RMC remains asserted even if signal AS may be deasserted during the intermediate states S5→S0. RMC is deasserted only in the state S0 which follows the last state S5.

Figure 2:
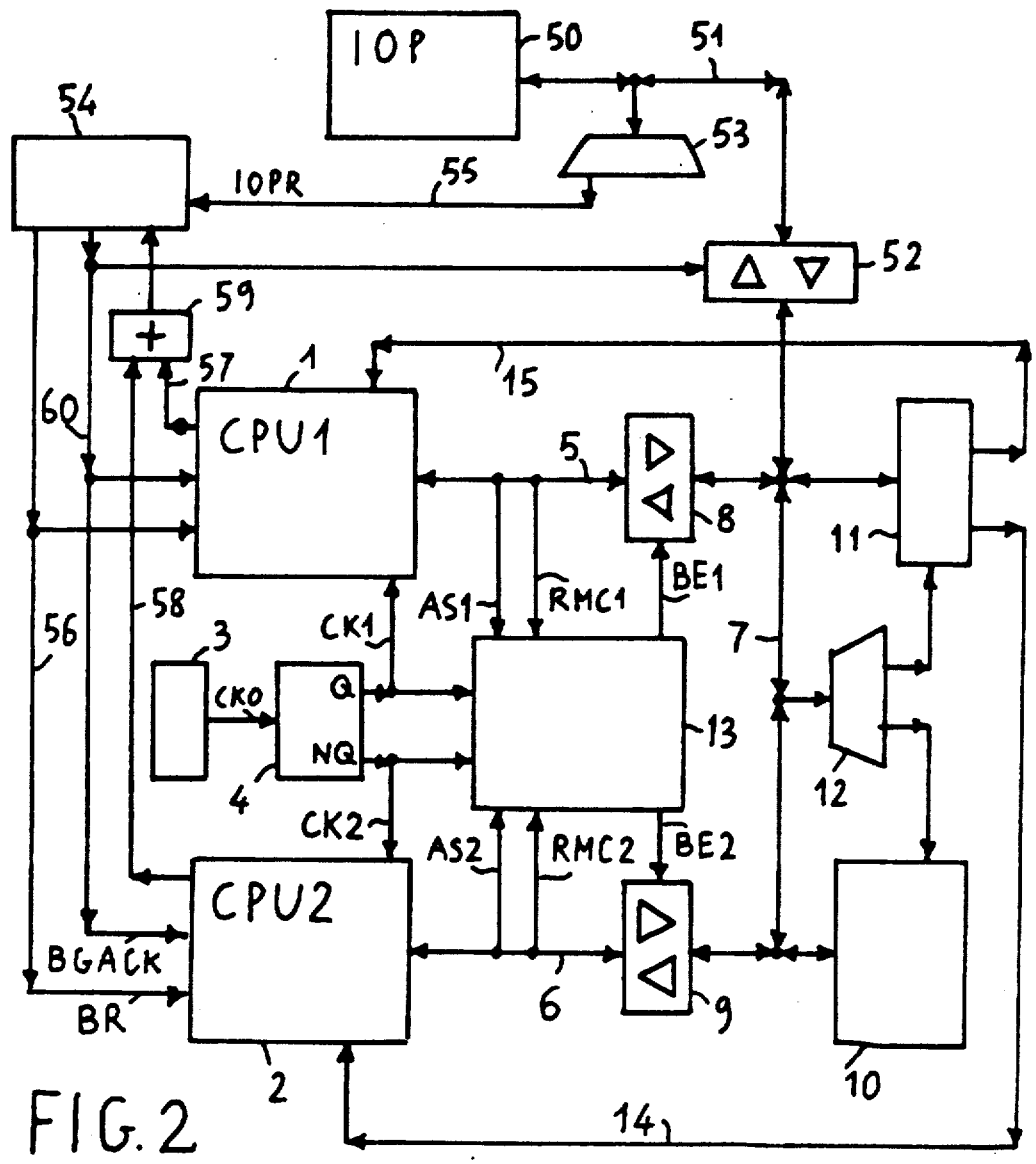
FIG. 2 shows, in block diagram, a preferred embodiment of a data processing system having a dual arbiter

Having pointed out these features, it is very easy to understand the operation of the system which is the object of the present invention and which is shown in FIG. 2. The system comprises two processors 1, 2 or CPU1, CPU2, each consisting of an MC 68030 microprocessor. The operation of the two processors is timed by an oscillator 3 which generates a signal CK0 at a frequency of 40 Mhz. This signal is applied to a flip flop 4 which acts as a frequency divider and issues, at its outputs Q and NQ, two square wave signals CK1, CK2 having a frequency of 20 Mhz, the signals being in phase opposition.

Hereinafter, the letter N preceding the name of an element or a signal has the meaning of negation/inversion.

CK1 and CK2 are used to respectively time processor 1 and processor 2. Therefore, the two processors operate with cycles of equal duration, but out of phase by a half period, so that an odd state (S1, S3, S5) of either one of the processors is synchronous with an even state (S0, S2, S4) of the other processor. Thus, it may be said that operation of the two processor is synchronous, but with a half period offset.

Processor 1 communicates with external units through an interface bus 5, and processor 2 communicates with external units through an interface bus 6. Through the interface busses, the two processors may exchange addresses, data, commands and signals (AS and RMC included) with external components. The two interface busses 5, 6 are connected to a system bus 7 through bidirectional gates or "transceivers" 8, 9, respectively. A working memory 10, a register bank 11 and a decoder 12 are also connected to the system bus.

It is clear that, within this architecture, CPU1, in order to have access to the memory 10 or to the register bank 11, has to place information onto bus 5 and from there, through gates 8, onto bus 7; this is in competition with CP2 which, in order to have access to memory 10, must put information onto bus 6 and from there through gates 9 onto bus 7.

A dual arbitrator 13 resolves the conflicts between CPU1 and CPU2 and grants access to the CPUs in a mutually exclusive way. Dual arbiter 13 receives signals AS1, RMC1, generated by processor 1 via the bus 5 and signals AS2, RMC2, generated by processor 2 via bus 6. It issues signals BE1, BE2 which respectively enable transceivers 8, 9 which are normally open so as to insulate bus 5 and 6 from bus 7. If bus 7 is free, as soon as arbitrator 13 receives signal AS1 asserted, gates 8 are enabled for the whole time interval required to transfer information. This time interval is defined by the asserted duration of AS1, or, in the appropriate case, by the asserted duration of RMC1. During this time interval, the enabling of gates 9 is prevented, even if processor 2 asserts signal AS2.

Therefore, the external operation requested by processor 2 is held pending on bus 6 until system bus 7 is disconnected from bus 5. At this time, signal AS2 is already present as an input to arbitrator 13, which, before processor 1 can again assert a new access request (that is, during state S1 of processor 1), enables gates 9 and prevents the enabling of gates 8 until the operations between processor 2 and systems bus have been completed.

Register bank 11 may be used as a fast memory, and also for interprocessor communication, by the known method of message mailboxing in selected memory areas and notification of a pending message to the destination processor. For instance, CPU1, after having stored a message for CPU2 in a "mailbox" of memory 10, may load a register in bank 11 with predetermined information. Bank 11 issues a notification signal on a lead 14, which notification signal is received by processor 2 through an interrupt input. In due time, CPU2 may take into account the notification signal and, by one or more memory access operations, may read the message. Similarly, CPU2 may notify CPU1 by means of bank 11 and a notification lead 15.

These operations (which are irrelevant to the scope of the subject invention) are described together with a specific embodiment in European Patent Publication N. 201020.

Figure 3:
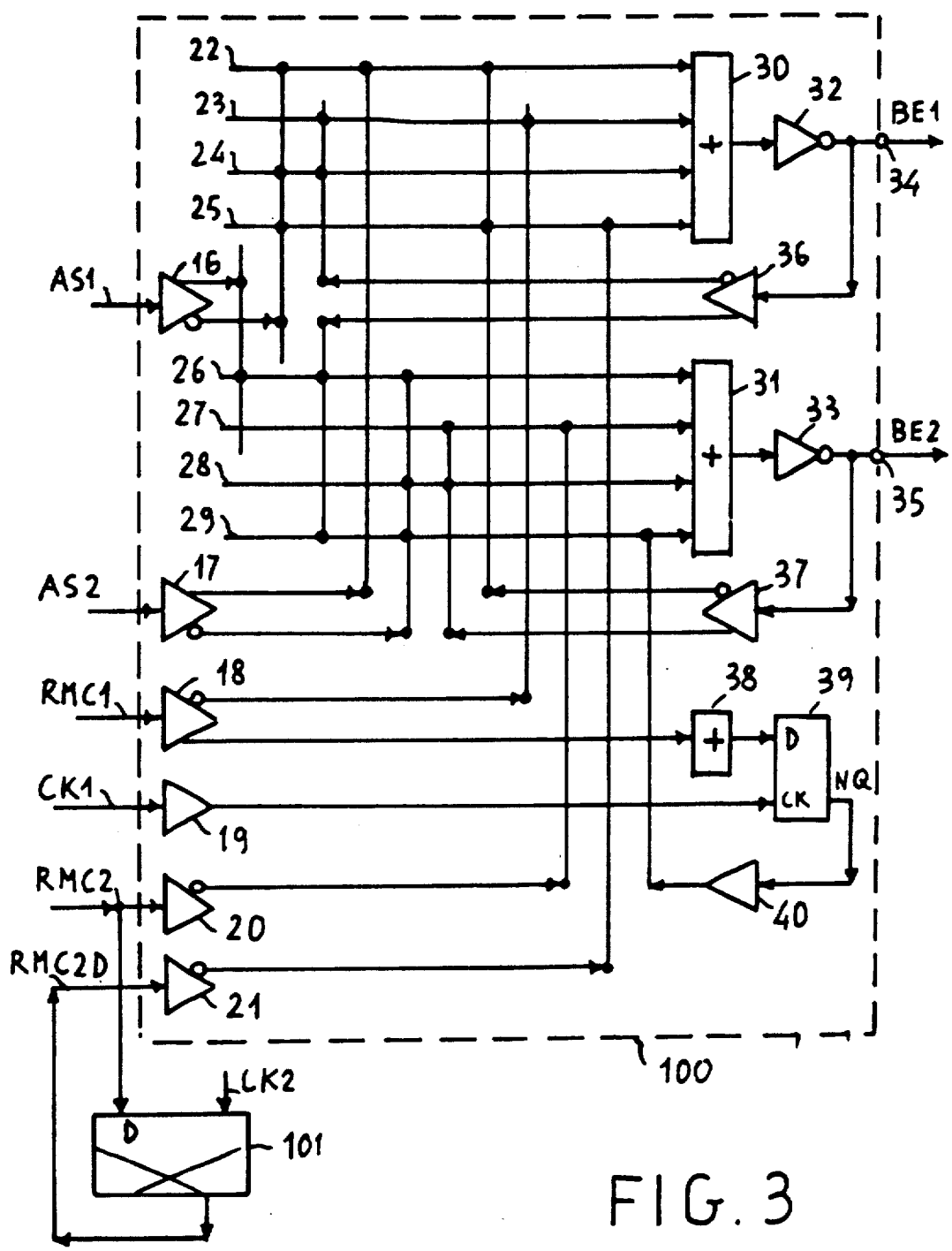
FIG. 3 is a logic diagram of a preferred embodiment of a dual arbiter for the system of FIG. 2

FIG. 3 shows a preferred embodiment for arbitrator 13. Arbitrator 13 comprises a fast PAL (Programmable Array Logic) 100 (for instance, that manufactured by the U.S. firm Monolithic Memories with code 16R4) and a fast flip flop 101. PAL 100 has a maximum signal propagation delay from input to output of 7.5 nsec; the minimum propagation delay is 3 nsec and the input capacitance is 5 pF. This device is particularly suitable for obtaining, from processors such as the 68030, very fast transitions of the output signals because, when driven by the processor outputs, it is seen by such outputs as a very small capacitive load.

Thus, when the two processors 1, 2 are controlled with clock signals in phase opposition, a time interval of at least 10 nsec, if not more, is assured between transitions of signals AS1 and AS2. This interval suffices for the correct operation of the arbitrator.

The circumstance that signals RMC1 and RMC2 are deasserted in a state other than S5, that is in state S0, causes a problem, as it will be seen later. This problem can be easily overcome and does not hamper the simplicity of the conceptual approach which is used.

Pal 100 comprises a plurality of input drivers 16, 17, 18, 19, 20, 21, each having inverting and non inverting outputs. The signals issued from the several drivers are distributed, through a plurality of connection columns, to a plurality of connection rows 22, 23, 24, 25, 26, 27, 28, 29. By suitably programming the PAL, selective connections among rows and columns are formed, and the connections are shown as dots located at the crossings. If a row is connected to a plurality of columns, it raises to a positive electrical level if all the columns to which it is connected are driven at positive level. Therefore, any row and the columns connected thereto functionally perform as an AND gate.

Rows 22 to 25 are connected to the inputs of an OR gate 30, and rows 26 to 29 are connected to the inputs of an OR gate 31. The outputs of gates 30, 31 are respectively connected to the input of inverting output drivers 32, 33. The outputs of drivers 32, 33 are respectively connected to the PAL output terminals 34, 35 and to the input of feedback drivers 36, 37, each having inverting and non inverting outputs.

The inverting and non inverting outputs of the feedback drivers are connected to selection columns, and through such columns, selectively to connection rows. The non inverting output of driver 18 is connected to the input of an OR gate 38 whose output is connected to the D input of a flip flop 39 which is clocked by the loading edge of a clock signal applied to the clock input. The non inverting output of driver 19 is connected to the clock input of flip flop 39. The inverting output of flip flop 39 is connected to the input of a feedback driver 40.

A D type flip flop 101, external to PAL 100, receives signal RMC2, generated by processor 2, at the D input and signal CK2 at the clock input. Flip flop 101 issues a signal RMC2D at its non inverting output Q. The input drivers 16 to 21 of PAL 100 receive, at their respectively inputs and in the naming order, signals AS1, AS2, RMC1, CK1, RMC2D.

Terminals 34, 35 issue signals BE1, BE2, respectively. BE1 and BE2 enable gates 8, 9 respectively (see FIG. 2).

Keeping in mind what has been said with reference to FIG. 1 as to the timing of signals AS, RMC and as to the inversion of the logical level relative to the electrical one, and further considering the connections shown in FIG. 3, the operation of the dual arbitrator of FIG. 3 is readily apparent in its details.

Row 22 generates the logical AND of signals NAS1·AS2·BE2=NBE1. It is therefore clear that if BE2 is deasserted (at electrical level 1), the gates 9 are disabled, and AS2 is deasserted too, the enabling signal BE1 becomes asserted with a maximum delay of 7 nsec as to the assertion of AS1 (that is, near the end of status S1 of processor 1). Row 24 forms the logical AND of signals NAS1·NBE1=NBE1 and assures that once BE1 is asserted, it is not deasserted, even if AS2 is subsequently asserted, until the end of status S5 of processor 1. Row 23 forms the logical AND of signals NRMC1·NBE1=NBE1 and assures that, in case of unseverable operation, once BE1 is asserted, it remains asserted until deassertion of RMC1.

Completely equivalent is the function performed by rows 26, 27, 28 and by OR gate 31 in the generation of signal BE2 at terminal 35.

It is clear that in the course of normal access operations to bus 7, the signals BE1, BE2 are deasserted at the end of status S5 of the related processor so that, in the following S0 state (of the related processor), it is only the other processor which may assert or have already asserted its own AS signal. In case of unseverable operation, the signal BE1 or BE2 is deasserted at the end of a new state S0 next following S5 (of the related processor). In this case a deadlock situation may occur.

Assume that BE2 is deasserted at the end of state S0 of processor 2, this states S0 being synchronous with an odd state of processor 1, hence being possibly synchronous with state S1 of processor 1. In this case, signal BE1 cannot be asserted during state S1 of processor 1 due to condition NBE2 being false in the logical operation performed by row 22. Therefore, the arbitration is performed at the beginning of state S2 (of processor 1) at which time, however, even signal AS2 may be reasserted which in turn prevents the assertion of BE1.

This deadlock situation is removed by means of an auxiliary signal RMC2D which copies the state of signal RMC2 with a suitable delay. Whilst RMC2 is deasserted during state S0 (of processor 2), RMC2D is deasserted only with the clock transition between state SI and state S2 (of processor 2). Row 25 performs the logical operation BE1=NAS1·BE2·NRMC2D and assures that processor may take ownership of the bus 7 as soon as BE2 is deasserted (that is at the beginning of state S1 of processor 2) even if processor 2 attempts to have access to the bus by assertion of AS2. Row 29 performs a logical operation similar to the one performed by row 25, say BE2=NAS2·BE1·NRMC1D. It guarantees that processor 2 gets ownership over the system bus, if requested by asserting AS2, at the end of an unseverable operation performed by processor 1. Signal RMC1D is generated by flip flop 39 internally to PAL 100.

It is clear that the previous description is related to preferred embodiment of the invention and that several changes can be made, depending on the processor and the working memory which are used. For instance, in FIG. 2 access to the system bus 7 is granted to the one or the other processor based on signal AS which they assert. It is clear that other signals may be used. For example, the processors 1 and 2 may each have an external cache memory connected to bus 5, 6 respectively, or a memory management unit MMU. In this case, it is well known that access to a working memory is requested only in case of read/write operations resulting from a "cache miss" indication and only when the address generated by the memory management unit is available. Therefore, the signal for requesting access to the system bus may result from the decoding of a plurality of signals present on the processor bus (for instance AS, and R/W, where R/W is a read/write signal) and others such as MISS from cache or PAS (Physical Address Strobe) from MMU, provided the resulting access request, equivalent to AS, is asserted and deasserted in a determined time phase. In this case, it may be given as certain that MISS and PAS will be generated in a state subsequent to S1 (usually S2), and any deadlock risk resulting from the late deassertion of signal RMC during state S0 is prevented.

The arbitrator of the invention is further compatible with other arbitration circuits of conventional nature so that its use is not limited to the case of data processing systems constituted by two processors only. For instance it is known that the 68030 microprocessor is provided with an internal mechanism for arbitration of the interface bus. If the microprocessor receives, at a suitable input, an external signal BR (Bus Request) requesting access to the bus, it asserts signal BG (Bus Grant) granting access to the bus after having completed possible external operations, hence not earlier than in state S0. Once BG is asserted and received by the external units, the highest priority external units (in case of plurality of external units) may have access to the bus.

FIG. 2 shows that, in addition to CPU1, CPU2, there is a third processor IOP 50 (IOP for Input Output Processor) which controls peripheral units not shown but intended to be connected to the IOP interface bus 51. The interface bus 50 for the IOP and peripheral units is connected to the system bus 7 by means of bidirectional gates 52. It is further connected to the inputs of a decoder 53. The signals on bus 51 are decoded by decoder 53 to detect access requests to system bus 7 and to generate a corresponding request signal IOPR. This signal is forwarded, through a lead 55, to a conventional arbitration unit 54. When IOPR is asserted, the arbitration unit 54 asserts a bus request signal BR on a lead 56 and forwards it to processors 1, 2. In due time, the two processors answer by asserting signal BG1, BG2 respectively on leads 57 58.

Leads 57, 58 are connected to the input of an OR gate 59 which performs the role of logical operator AND on signals BG1, BG2 (at electrical level 0 when asserted) and issues towards arbitrator 54 a signal BG asserted. On receipt of BG, the arbitrator 54 sends a signal BGACK on lead 60 to processors 1, 2. Signal BGACK indicates that arbitrator 54 has taken ownership on the system bus, and the same signal may be used to enable gates 52.

Other possible changes may relate to the nature of the destination units, such as memory 10, connected to the system bus 7. In the preceding description there is the implied assumption that memory 10 and register bank 11 operate asynchronously relative to CPU1 and CPU2. However, it is possible to use destination units of synchronous type which are synchronized every time with the processor which gets access to the system bus. In this case, arbitrator 13 will have to provide, through suitable logic circuits, either one or the other of signals CK1, CK2 to the units 10, 11, and this in addition to the mutually exclusive enabling of gates 8, 9.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A data processing system comprising at least a first and a second processor connected to a system bus for access to common resources, a timing unit connected to said first and second processors, said timing unit generating two periodic timing signals having equal frequency, but out of phase the one as to the other, each period of said periodic timing signals comprising two phases, a phase at least of each one of said periodic timing signals being time distinct and non overlapped to the corresponding phase of the other of said periodic timing signals, and arbitration logic means connected to said timing unit and to said first and second processors for controlling access to said system bus by said first and second processors, said first processor being clocked by one of said periodic timing signals for asserting a first request signal requesting access to said system bus in said time distinct phase of said one periodic timing signal and for providing said first request signal to said arbitration logic means, said second processor being clocked by the other of said periodic timing signals for asserting a second request signal requesting access to said system bus in said time distinct phase of said other periodic timing signal, and said arbitration logic means receiving said two periodic timing signals and said first and second request signals asserted during each of said time distinct and non overlapped phases of said periodic signals, and asserting a first enable signal granting bus access to said first processor if said first request signal is asserted and said second request signal is deasserted, and asserting a second enable signal granting bus access to said second processor if said second request signal and said first request signal is deasserted.

2. A data processing system as in claim 1 comprising at least a third processor connected to said system bus, request means connected to said third processor for asserting a third request signal requesting access to said system bus by said third processor and arbitration circuits, connected to said request means and to said first and second processor and responsive to said third request signal asserted for requesting access to said system bus both to said first and second processors and for asserting a third enable signal, granting access to said third processor once an asserted access grant signal is received from both said first and second processors.

* * * * *